United States Patent
Setia et al.

(10) Patent No.: US 9,231,911 B2
(45) Date of Patent: Jan. 5, 2016

(54) PER-USER FIREWALL

(75) Inventors: Deepinder Setia, San Ramon, CA (US); John Taylor, Tiburon, CA (US); Keerti Melkote, San Jose, CA (US); Brijesh Nambiar, Sunnyvale, CA (US)

(73) Assignee: ARUBA NETWORKS, INC., San Jose, CA (US)

( * ) Notice: Subject to any disclaimer, the term of this patent is extended or adjusted under 35 U.S.C. 154(b) by 2167 days.

(21) Appl. No.: 11/582,096

(22) Filed: Oct. 16, 2006

(65) Prior Publication Data

US 2008/0092223 A1    Apr. 17, 2008

(51) Int. Cl.
    *H04L 29/06*    (2006.01)

(52) U.S. Cl.
    CPC .............. *H04L 63/0227* (2013.01); *H04L 63/08* (2013.01); *H04L 63/101* (2013.01)

(58) Field of Classification Search
    CPC ............ H04L 63/0227; H04L 63/0236; H04L 63/0245; H04L 63/0254
    USPC ......................... 726/13, 11, 14, 15, 23, 22, 25
    See application file for complete search history.

(56) References Cited

U.S. PATENT DOCUMENTS

| | | | |
|---|---|---|---|
| 2004/0199635 A1* | 10/2004 | Ta et al. | 709/226 |
| 2005/0055573 A1* | 3/2005 | Smith | 713/201 |
| 2005/0060328 A1* | 3/2005 | Suhonen et al. | 707/100 |
| 2006/0282893 A1* | 12/2006 | Wu et al. | 726/23 |

* cited by examiner

*Primary Examiner* — Edward Zee
(74) *Attorney, Agent, or Firm* — Mannava & Kang, P.C.

(57) ABSTRACT

A network device to provide per-user firewall capabilities. The network device identifies a user associated with a received frame and a role of the user. The network device determines the firewall actions to be taken for the frame based on the role of the associated user. The user role may be dynamically changed by an administrator or automatically. A user role may be altered based on the authentication level of the user. The network device provides a system where a customized authentication experience may be provided for each user and services and permissions may be managed on a per-user basis.

21 Claims, 5 Drawing Sheets

PER-USER FIREWALL

BACKGROUND

1. Field of the Invention

The embodiments of the invention relate to a method and apparatus for applying firewall rules and actions on a per-user basis. Specifically, embodiments of the invention related to a method and apparatus for identifying a user and a user role for packets or frames being processed by a network element.

2. Background

Private networks such as local area network (LANS) or virtual LANs (VLANs) often utilize a switch or set or switches to route data traffic between the devices on the private network and between devices on the network and remote devices accessible through a wide area network (WAN) such as the Internet or similar networks. The switches and devices may communicate over a wired communication line or over wireless communication channels. The switches are responsible for routing data and enforcing network wide rune.

The private network and the devices on the network are vulnerable to attack by malicious hackers and similar threats. Hackers and similar threats seek to gain access to computers on the private network to gain access to their resources or utilize them for their own purposes. It is difficult to maintain and secure the network at each of the devices on the network as they may have different platforms requiring different types of security programs. Instead of or in addition to security protection installed at each of the devices of the network, a switch on the network that provides the link to the WAN may include a firewall. A firewall is a program that is executed by the switch that filters incoming data to block malicious data traffic and implements similar policies on the network.

The firewall implements its filter and protection as a set of policies that govern which traffic is allowed to enter the private network from the WAN. These firewall policies are applied globally to all incoming traffic to protect the private network. For example, a firewall policy may restrict data traffic to a set of defined ports. All devices on the private network that wish to receive data from or send traffic to devices on the WAN must utilize these ports or the data traffic will be blocked by the firewall.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

In the following description, for the purpose of explanation, numerous specific details are set forth in order to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations. For example, the embodiments are described as processing frames for sake of clarity. However, one skilled in the art would understand that the processing of packets and similar data structures also falls within the scope of the invention contemplated. Similarly, the embodiments are described in reference to the components and function of a switch. One skilled in the art would understand that these methods and structures are also applicable to other types of network devices. References to L1-L7 as used herein refer to the layers of the Open Systems Interconnection reference model.

Figure 1:
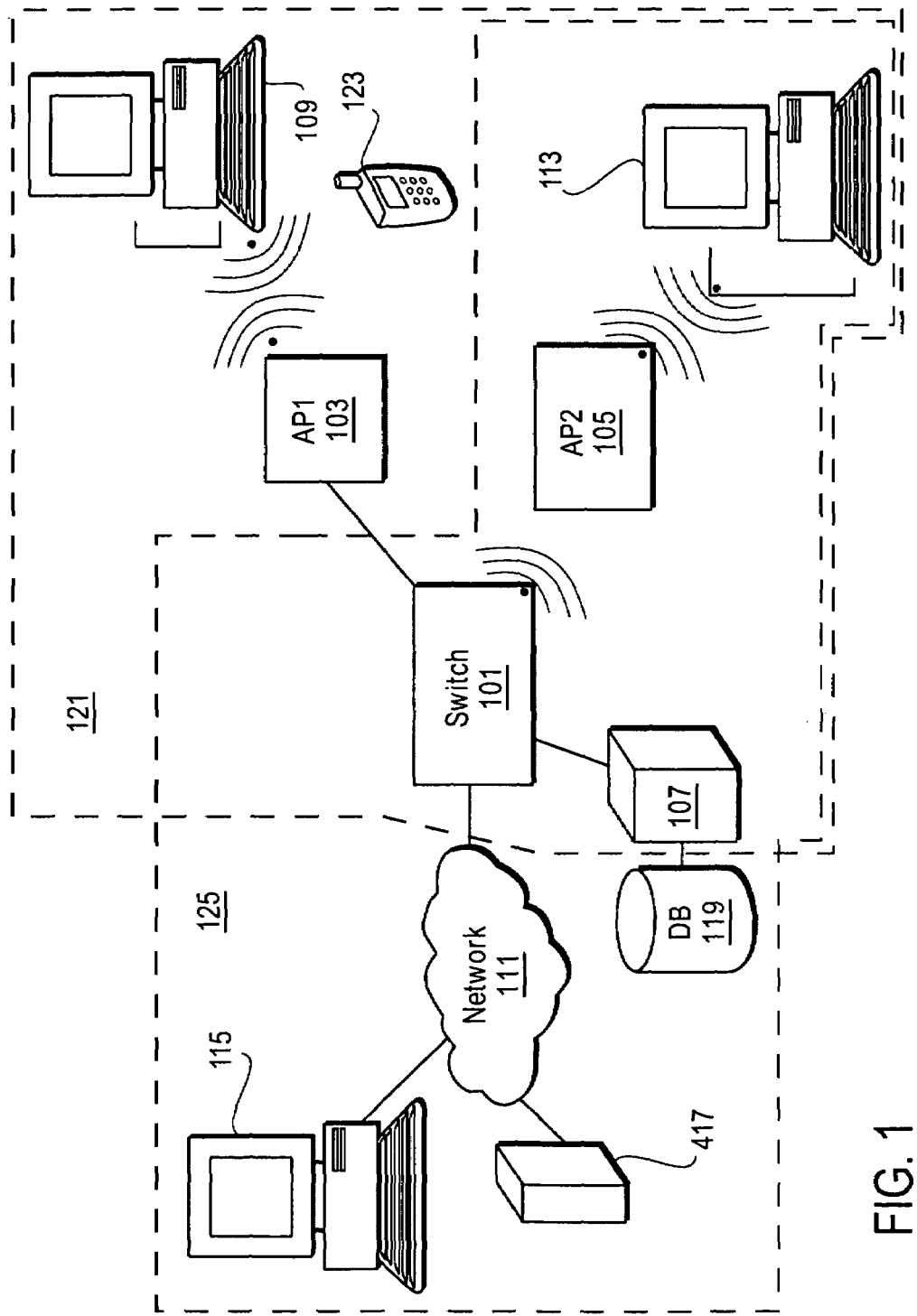
FIG. 1 is a diagram of one embodiment of a local area network and virtual local area network including a switch supporting a per-user firewall.

FIG. 1 is a diagram of one embodiment of a local area network (LAN) and a virtual local area network (VLAN) including a switch supporting a per-user firewall. In one embodiment, the local area network 121 may include a switch 101, a set of access points (AP) 103, 105, and a set of devices 109, 113, 107, 123 that communicate over the network. The LAN 121 may be connected to a wide area network (WAN) 111 through the switch 101. The WAN 111 may provide communication between additional devices 115, 117 and the devices on the local area network 121. In one embodiment, the WAN 111 may be the Internet or similar network.

In one embodiment, the switch 101 may be a router, wireless router, hub or similar type of network element or device. The switch 101 may provide or assist in the communication between all of the devices of the LAN 121 and between those devices and devices external to the LAN 121. In one embodiment, the switch 101 provides routing, network address translation (NAT) and similar services for the LAN. The switch 101 may also provide a firewall to protect the LAN 121 from malicious attacks and similar threats from outside of the network.

The switch 101 may communicate with other devices in the LAN 121 through any type of communication medium including wireline communication such as category 5 type cabling and similar cabling or wireless communication such as WiFi, Bluetooth, 802.11b/g or similar wireless technologies. The switch 101 may communicate directly with other devices 107 or through intermediate devices such as access points 103, 105. Access points 103, 105 and similar types of devices may be used to connect other devices to the LAN 121. Access points may provide wired or wireless connectivity. Each access point 103, 105 may allow multiple devices to connect to the local area network. The access points 103, 105 may process the traffic received over the LAN 121 or may pass the data on toward its destination or to the switch with minimal processing.

The switch 101 may communicate with other devices in the LAN 121 through any type of communication medium including wireline communication such as category 5 type cabling and similar cabling or wireless communication such as WiFi, BLUETOOTH®, 802.11 b/g or similar wireless technologies. The switch 101 may communicate directly with other devices 107 or through intermediate devices such as access points 103, 105. Access points 103, 105 and similar types of devices may be used to connect other devices to the LAN 121. Access points may provide wired or wireless connectivity. Each access point 103, 105 may allow multiple devices to connect to the local area network. The access points 103, 105 may process the traffic received over the LAN 121 or may pass the data on toward its destination or to the switch with minimal processing.

In one embodiment, the LAN 121 may include an authentication server 107. The authentication server 107 may verify users or devices for access to the local area network. The authentication server 107 and switch 101 may work in combination to deny or restrict access to the LAN 121. The authentication server 107 and database 119 may store data relating to each user of the network, including permissions and security characteristics and similar information. In one embodiment, the authentication server 107 and database may store and track a role assigned to each user. As used herein a role may refer to a set of permissions or a set of rules, such as firewall policy rules or actions that are associated with a user. The role may define the types of services provided by the LAN, the switch, the firewall and similar service providers or gatekeepers. The authentication server 107 may be a Radius server, a server supporting the XML API for RFC 3576 or similar type of server. The database 119 may be any type of database including a relational database, object oriented database or similar database and database management system.

In one embodiment, a VLAN 125 may include a set of devices 107, 113, 115 and 117 that communicate over a physical WAN 111 and physical LAN 121 or a set of local area networks. The VLAN 125 may be used to secure data exchanged between the devices of the VLAN 125 and to exclude other devices from having access to this data as well as provide access to the services of a local area network to remote devices. For example, a VLAN 125 may be used to incorporate a desktop computer of a worker who is working at home into a corporate network as though the remote computer was located with the other computers and connected to them via a conventional local area network connection. The interconnections of a VLAN 125 may be wired or wireless.

The switch 101 provides similar functionality to the VLAN 125 as it provides to a standard LAN 121. The switch 101 also enforces the VLAN 125 by managing the traffic designated for the VLAN 125. Managing the traffic for the VLAN 125 may include identifying packets and frames that are part of the VLAN 125. The switch 101 may work in combination with the authentication server 107 to determine which users and devices have access to the VLAN 125.

In another embodiment, the switch 101 may carry out authentication internally for the VLAN 125 and standard LAN 121. The switch 101 may store the necessary data for authenticating a user or device without the need for a separate authentication server or database.

Figure 2:
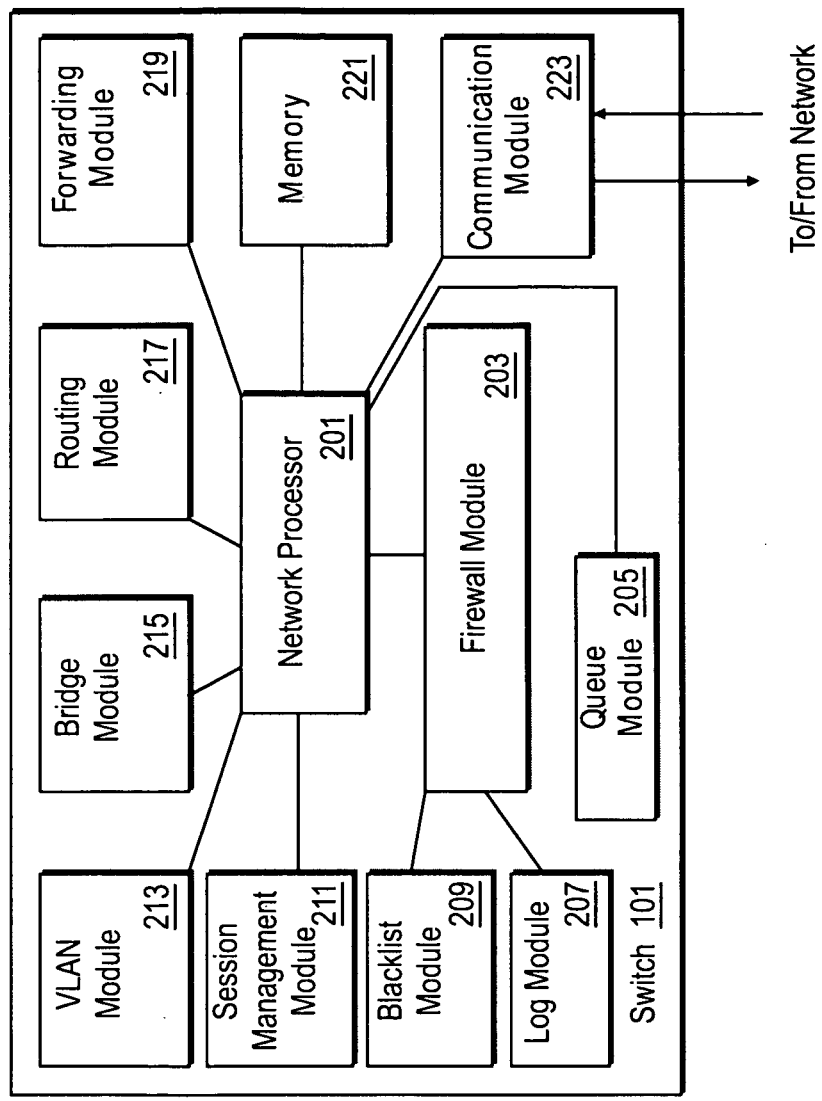
FIG. 2 is a diagram of one embodiment of a switch supporting a per-user firewall.

FIG. 2 is a diagram of one embodiment of a switch supporting a per-user firewall. In one embodiment, a switch 101 may include a set of components including a network processor 201 or set of network processors, a firewall module 203, memory 221, communication module 223, queue module 205, log module 207, blacklist module 209, session management module 211, VLAN module 213, bridge module 215, routing module, 217, forwarding module 219 and similar components. These modules may be discrete hardware components, software stored within the switch and executed by the network processor or combinations thereof. These modules may be structured as separate software or hardware entities or may be combined with one another in any combination.

In one embodiment, the switch 101 may include a network processor 201. The network processor 201 may execute software modules to carry out the functionality of the switch 101.

In another embodiment, multiple network processors may divide the work of the switch 101. For sake of convenience, an example using a single network processor is discussed herein. One of ordinary skill in the art would understand that the invention also contemplates that the functionality of the switch 101 may be carried out by a set of network processors.

The network processor 201 may use memory 221 as a working memory. The switch 101 may use the memory 221 as a cache for VLAN tables, bridge tables, routing tables, blacklists, session data and similar data. The memory 221 may be a static or dynamic random access memory. In other embodiments, any type of memory device may be used. In a further embodiment, a long term or larger storage device such as hard disk drive may also be included in the switch 101.

In one embodiment, the switch 101 includes a firewall module 203. The firewall module 203 manages the filtering of data traffic through the switch 101. As frames are received through the communications module 223 the firewall blocks, e.g. drops, frames that violate the policies of the firewall. The policies of the firewall may include the restriction of traffic to a set of defined ports, allot a predefined amount of bandwidth to a port or user, control access to a defined set of protocols, source addresses or similar criteria such as access control lists or provide similar services. Each of these services may be determined on a per-user basis. As used herein a user may refer to an individual using a specific machine in the network or an individual that may use any machine in the network. A user may be assigned a role that defines a set of rules to be applied by the switch or firewall, including rules that permit or deny access to services or define a set of actions to be taken by the switch. A user's role may be stored or tracked in the switch memory 221 or external to the switch 101. The user's role may be static or dynamic. A user's role may be set by an administrator or dynamically determined as discussed further below. A user identity may be based on L2 and L3 parameters or similar information.

A firewall module 203 may support a set of actions including: deny, permit, redirect, NAT, blacklist, log, mirror, queue, type of service (TOS), bandwidth allotment and similar actions. Each of these actions may be associated or defined for a given role and thus for a given user. The firewall module 203 or session management module 211 may lookup or similarly determine the role for a user to determine which of these actions to take for data traffic associated with that user and user role. Any combination of these actions may be associated and applied to a role or user.

In one embodiment, a deny action blocks or deletes a frame. A deny action may be utilized if the frame violates a policy of the firewall module 203 or if associated with a user that does not have the necessary role. For example, a user may be determined to have a role that does not permit access or use of a certain port. If a frame associated with the user is received by the switch 101 that is destined for that port then the frame may be denied.

In one embodiment, a permit action allows a frame to be processed as intended. The permit action may be designated if the user has the appropriate role to utilize the required resources.

In one embodiment, a redirect action may be used to forward a frame to a location other than the destination address indicated by the frame. A mirror action may be used to copy a frame and send the copy to a designated address that may be different than the destination address of the frame. A network address translation (NAT) action may be used to translate the destination address of a frame into another format or for use on a subnet or under similar circumstances. A TOS action may be used to detect or change the type of service designated in a frame. This may include changing the protocol or similar characteristics of the frame. Each of these actions may be associated with a specific user or role.

In one embodiment, the log action may be used to record an action or event in the switch, such as a frame that was denied. The log may be used by other modules in combination with other actions to monitor the condition of the switch 101 and to detect attempted security breaches. A log action may be used on a per-user or role basis to record events specific to a user or similar events.

In one embodiment, a queue action may be used to prioritize packets and frames received by the switch 101 for forwarding and similar processing. The prioritization may be designated per-user or role such that certain users or roles may be given priority in processing through the prioritization in the queue thereby providing a higher quality of service to these users.

In one embodiment, a blacklist action may be used to designate a specific user or set of users as blacklisted thereby denying the blacklisted user's access to all or a defined set of the services of the switch and its associated networks. A blacklist maybe created by an administrator of the switch 101, the VLAN or LAN or may be automatically updated or modified in response to the detection of improper behavior on the part of the user. For example, if a user is logged attempting to use a service repeatedly that he does not have proper access to then the user may be blacklisted as a potential security threat automatically.

In one embodiment, a bandwidth allotment action may be used to assign a specific bandwidth to a user, session or similar entity. The bandwidth may be tied to a role of a user. The bandwidth allotment may be implemented through prioritizing frames associated with a user or through a similar mechanism. In one embodiment, bandwidth allotment may be managed by traffic shaping or similar bandwidth allotment schemes. Each user, session or frame may be assigned or 'contracted' a transmission rate. For example, this may be implemented using a leaky bucket algorithm. If there are tokens in a bucket when a frame is assigned to it by contact, the frame may be forwarded, expending a token or set of tokens. If there are no tokens then the frame may be queue until tokens are added to its bucket. In an example embodiment, a maximum of 64 kilobytes of data may be queued per contract, where a token is used to allow a byte of data transmission. Thus, a 64 B frame would expend 64 tokens. If a user or session attempts to transmit above a contracted rate the data will be queued and released at the contracted rate and excess traffic will be dropped.

In one embodiment, the switch 101 may include a VLAN module 213. The VLAN module 213 may perform processing of frames that are associated with a VLAN. This processing may include assigning VLAN identifiers to frames, maintaining a VLAN table, address translation and routing associated with the VLAN, encryption and similar processes relevant to the maintenance of a VLAN.

In one embodiment, the switch 101 may include a bridge module 215. The bridge module 215 may perform processing related to maintaining a bridge table and similar L2 type processing. The bridge may learn MAC addresses and resolve destination MAC addresses. A virtual bridge table may be maintained for each VLAN.

In one embodiment, the switch 201 may include a session management module 211. The session management module 211 may maintain a state of each session processed by the switch 101 thereby making the system a stateful system. Maintaining the session state allows the switch 101 and firewall module 203 to apply or determine the applicable firewall policies once for each session instead of having to make the determination per frame. Each frame associated with a tracked session can be handled as indicated in the session state information. A frame associated with a session that is not currently being tracked will allow the detection of new sessions and the initiation of the tracking of those sessions.

In one embodiment, the IP address, protocol and L4 ports for a frame may be used to lookup the session in the session table. If a matching entry is found then the associated session data may be retrieved which may include information related to the users and roles associated with the session. The user and role data may be use to determine the actions to be taken by the firewall module 203.

In one embodiment, the session management module 211 may also coordinate the authentication of a user for a new session by sending a message to an authentication server to authenticate a user. The response may be used to update the session data tracked by the session management. Authentication may designate the user role to be applied to the new session and stored in the session table.

In one embodiment, the switch 101 includes a routing module 217 that processes frames and determines a route for the packet or frame to its destination. The routing module 217 maintains a routing table for retrieving and storing routing information. A forwarding module 219 uses this information to prepare and send the frame through the appropriate physical or logical port. The forwarding module 219 queues the frames and may implement a bandwidth allotment scheme in conjunction with the firewall module 203. In one embodiment, a queuing module 205 may manage prioritization of packets and frames in outbound and inbound queues in conjunction with the forwarding module 219 and the firewall module 203.

In one embodiment, a communication module 223 may handle the physical transmission and reception of data at the direction of the other modules. The communication module 223 may process the frames in the order indicated by the inbound or outbound queues.

In one embodiment, the switch may include a blacklist 209 module. The blacklist module 209 may track and detect users that have violated a firewall policy or repeatedly violated a firewall policy or similar rules. An administrator may set any threshold or criteria for activities that trigger automatic blacklisting. In another embodiment, the administrator may control the blacklist. The firewall module 203 may enforce the blacklist by denying all traffic associated with a blacklisted user.

In one embodiment, a switch 101 may include a log module 207. The log module 207 may manage the recording of events in the switch 101. The log module 207 may record activities such as firewall actions on a per-user basis. A log entry may be associated with a user. The log entries may be used to detect security violations and for automated blacklisting, as well as for general traffic monitoring and switch operation.

In one embodiment, a switch may be implemented to include a set of cards, such as line cards and control cards, which allow for the switch to be easily modified and upgraded. In this embodiment, the various components may be part of line cards or control cards. For example, a separate network processor 201 may be present on each control card. Separate communication modules may be part of each line card. Any combination of components may be placed on any number or line and control cards.

Figure 3:
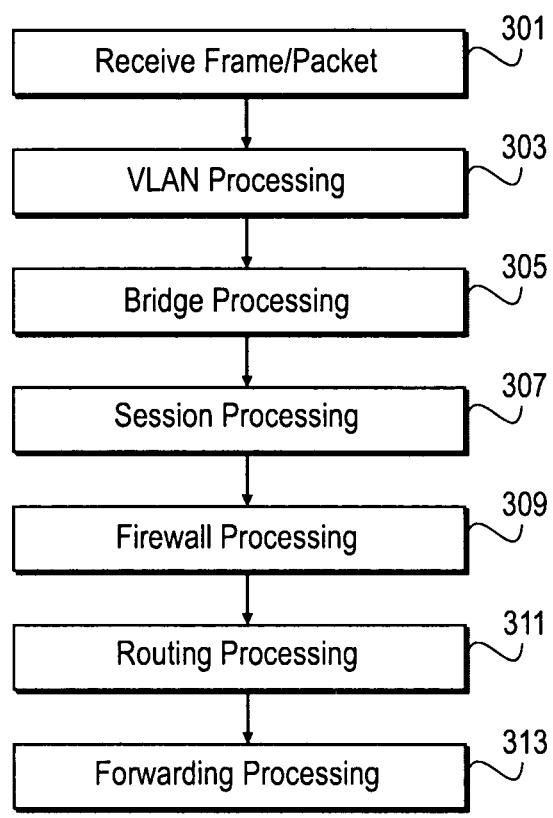
FIG. 3 is a flowchart of one embodiment of a process for processing frames by the switch.

FIG. 3 is a flowchart of one embodiment of a process for processing frames by the switch. In one embodiment, the switch may begin the processing of a frame upon receiving the frame over a network connection or at a port of the switch (block 301). As mentioned above, for sake of convenience we discuss the embodiments in the context of frame processing however one skilled in the art would understand that packet processing and the processing of similar formats of data are within the scope of the invention.

The incoming frame may be placed for processing within an inbound queue. The frames may be processed in the order that they are received. In another embodiment, the frames are processed based on priority data in the frame. In a further embodiment, a user of the frame may be identified so that a rule associated with a role of the user can be identified to determine if the frame has a higher or low priority. A user role associated with the incoming frame may be used to shape traffic in the same manner as outgoing traffic discussed above. For example, the incoming traffic may be associated with a user that has a bandwidth contract, which is enforced for the incoming traffic.

In one embodiment, the frame may first be processed by the VLAN module or similar module to determine whether the frame is associated with a VLAN (block 303). A look up may be performed to determine if the source or destination address or similar characteristics of the frame indicate it is associated with a VLAN. The VLAN processing may add a VLAN identifier to the frame if it is determined to be associated with a VLAN. The VLAN processing may also determine routing and similar information related to the VLAN.

In one embodiment, the switch may then perform bridge processing (block 305). Bridge processing may involve performing all L3 processing of the frame. The bridge processing may include learning source MAC addresses and resolving destination MAC addresses. A bridge table may be maintained and updated with each frame received. A virtual bridge table for each VLAN may be updated as new addresses for a VLAN are learned.

In one embodiment, the switch performs session processing (block 307). The switch determines which session the frame is associated with. A look up may be performed to determine if an entry matching the frame is present in the session table. A look up may be performed using the source address, destination address, inbound port, outbound port and protocol or similar characteristics of the frame. The session data may include user identification, role information and similar data. The role information and user information may be used to determine a user role and apply firewall actions to the frame.

In one embodiment, the firewall policies and actions are applied using the role and user information provided by the session processing (block 309). The application of firewall policies and actions are discussed further in regard to FIG. 4 below.

In one embodiment, a frame is routed after application of the firewall polices (block 311). The switch determines routing data for the frame and maintains routing tables. The frame may then be prepared for forwarding (block 313). The forwarding processing may include prioritizing the frames based on the user roles and similar criteria. The allotment of bandwidth based on user roles may also be implemented through the forwarding processes. Frames associated with higher bandwidth session may be prioritized or over frames associated with lower bandwidth sessions. In other embodiments, the processing of frames by the switch may take place in alternate sequences. For example, in some embodiments, routing may be conducted before session processing is completed.

Figure 4:
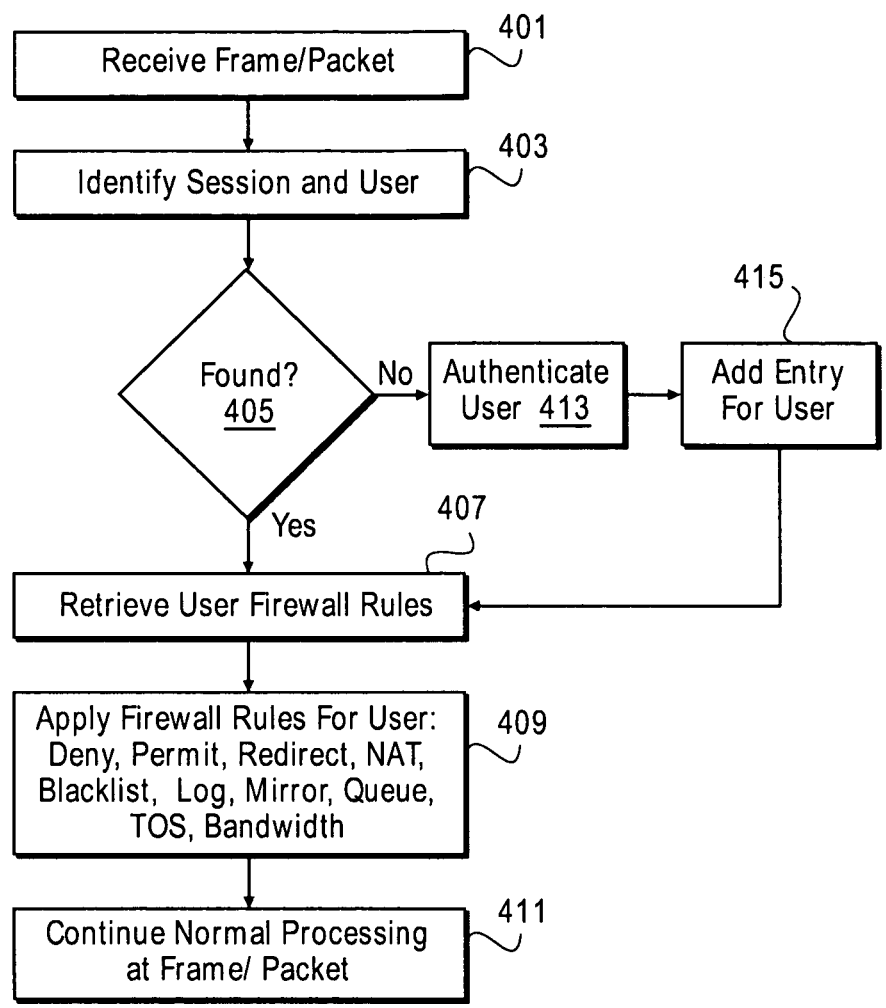
FIG. 4 is a flowchart of one embodiment of a firewall process applying rules on a per-user basis.

FIG. 4 is a flowchart of one embodiment of a firewall process applying rules on a per-user basis. In one embodiment, the illustrated process is implemented as part of the firewall module. In another embodiment, the process may be distributed over a firewall module and session management module or similarly distributed across modules, processors and other switch components.

The application of per-user firewall policies may be initiated as the frame is received by the switch, session management module or firewall module (block 401). The session and user may be identified using information from the frame including the source address and port, the destination address and port and the protocol of the frame (block 403). This information is matched against a session table or similar table (block 405). If an entry for the session is not found then a new entry may be created. The user may be authenticated as discussed below in regard to FIG. 5 (block 413). After the user has been authenticated a new entry may be entered into the session table (block 415).

After the user has been authenticated or if an entry was found in the session table the user firewall rules may be retrieved (block 407). Any number or combination of rules may tied to a user or role. In one embodiment, the firewall actions tied to the role or user may be have a predefined order or priority. The firewall rules may be applied in this order (block 409). The firewall actions may include: deny, permit, redirect, NAT, blacklist, log, mirror, queue, TOS, bandwidth allotment and similar actions. After each rule and consequent action is applied, then the frame may be forwarded for further processing as described above (block 411).

Figure 5:
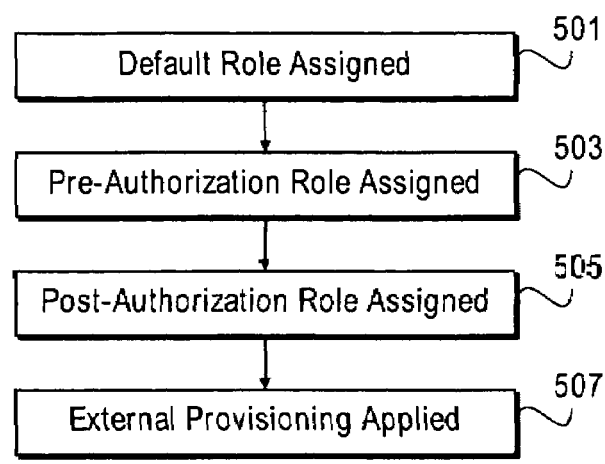
FIG. 5 is a flowchart of one embodiment of a process for determining a role of a user.

FIG. 5 is a flowchart of one embodiment of a process for determining a role of a user. In one embodiment, a firewall module or switch may apply a default role to a frame or user as a frame is started to be processed by the switch (block 501). The default role may only give the user minimal access and service permissions. For example, the default role may restrict services to authentication related services such as captive portal and virtual private networking (VPN) authentication. This allows the user and frame to obtain authentication to obtain other roles.

A frame, as it is further processed, may be identified as part of a particular session or as including identifying information such as the service set identifier (SSID), basic service set identification (BSSID), user MAC address, encryption type and similar information. This information may be used to assign a pre-authentication role to the user or frame (block 503). A pre-authentication role may have more expansive services available such as ports associated with common applications and similar services, communication routes and ports that allow the frame to be further authenticated or processed.

In one embodiment, a full authentication may be obtained for a user, session or frame (block 505). Post-authentication roles may define any service or communication route or port available to the switch as available or applicable to the frame. Any combination of policies, rules, communication routes, ports or similar services may be assigned to a post-authentication role. This allows for a customized authentication method and experience to be crafted on a per-user basis.

In one embodiment, the role of the session, frame or user may be further modified by external provisioning (block 507). An external provisioning agent may allow an administrator, user or other individual or program using supported APIs to modify a user role or the definition of a role. This allows the role, sessions, firewall rules and similar aspects of the system to be modified dynamically.

In another embodiment, role assignment may be application aware. Role assignments may be adjusted automatically by inspecting frames transmitted to and from a destination address and port or similar identifier for an application. For example, if a client application is connected to an access point that is performing 802.1x authentication with a radius server, the switch may monitor the frames between the access point and the radius server. The frames may be inspected to determine if the authentication is successful and alter the assigned role if the authentication is successful. In another example, a session initiation protocol (SIP) phone may communicate with an SIP server through the switch. By inspecting registration and invite messages between the phone and the SIP server, the switch may assign a specialized role to the SIP phone.

In one embodiment, the per-user firewall system may be implemented as a set of hardware components. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A non-transitory computer readable medium comprising instructions which, when executed by one or more hardware processors, cause the one or more hardware processors to:
receive, at a first network device in a Local Area Network (LAN), a first packet associated with a first user device of a first user;
determine the first user device, inside the LAN, associated with the first packet received at the first network device;
assign a default role to the first user upon receiving the first packet, the default role providing services enabling the first user for a pre-authentication role with greater access to network services than the default role;
assign the pre-authentication role to the first user, the pre-authentication role enabling the first user to access common applications;
select, from a plurality of rules, a first set of one or more rules associated with a first role corresponding to the first user;
apply, upon authentication, at least the first set of rules to the first packet to determine a first priority level in a forwarding queue for the first packet;
forward the first packet from the first network device according to the first priority level to control the quality of service provided to the first user device inside the LAN.

2. The medium of claim 1, wherein the instructions to apply at least the first set of rules are to cause the one or more hardware processors to:
allow forwarding of portions of data that are addressed to a set of ports allowed for the first user device and restricting forwarding of portions of the data that are not addressed to the set of ports allowed for the first user device.

3. The medium of claim 1, wherein the instructions are further to cause the one or more hardware processors to:
allow forwarding of portions of data that are associated with a set of protocols allowed for the first user device and restrict forwarding of portions of data that are not associated with the set of protocols allowed for the first user device.

4. The medium of claim 1, wherein the instructions are further to cause the one or more hardware processors to:
allow forwarding of portions of data that are associated with one of a set of source addresses allowed for the first user device and restrict forwarding of portions of data that are not associated with any of the set of source addresses allowed for the first user device.

5. The medium of claim 1, wherein the first network device, in the LAN, is a switch.

6. The medium of claim 1, wherein the instructions are further to cause the one or more processors to apply the set of rules to further determine one or more of the following actions for at least a portion of the first packet: deny, permit, redirect, Network Address Translation (NAT), blacklist, log, mirror, queue, or select type of service.

7. The medium of claim 1, wherein the instructions that are to cause the one or more hardware processors to forward the first packet comprise one or more of: (a) instructions to cause the one or more hardware processors to redirect a first portion of the first packet, (b) instructions to cause the one or more hardware processors to perform a Network Address Translation (NAT) action on the first portion of the first packet, or (c) instructions to cause the one or more hardware processors to mirror the first portion of the first packet.

8. The medium of claim 1, wherein the instructions to apply at least the first set of rules are to cause the one or more hardware processors to apply at least the first set of rules to further detect a type of service for the first packet.

9. The medium of claim 1, further comprising instructions that are to cause the one or more hardware processors to:
identify the first user by a source address of the first packet.

10. The medium of claim 1, further comprising instructions that are to cause the one or more hardware processors to:
alter the first role of the first user in response to an external provisioning message, the altered role of the first user comprising a second set of permissions or rules that are associated with the first user.

11. The medium of claim 1, further comprising instructions that are to cause the one or more hardware processors to:
receive, at the first network device in the LAN, a second packet from a third network device outside of the LAN;
determine a second user device, inside the LAN, associated with the second packet received at the first network device;
select a second set of one or more rules, from the plurality of rules, corresponding to the second user device associated with the second packet;
apply at least the second set of rules to the second packet to determine a second priority level in the forwarding queue for the second packet, wherein the second priority level is lower than the first priority level; and
forward the second packet from the first network device to the second user device according to the second priority level such that the network provides a lower quality of service to the second user than the first user.

12. A network device comprising:
a hardware processor; and
a memory comprising instructions that causes the processor to:
receive, at the network device, a first packet associated with a first user device of a first user;
determine the first user device, inside the LAN, associated with the first packet received at the network device;

assign a default role to the first user upon receiving the first packet, the default role providing services enabling the first user for a pre-authenticating role with greater access to network services than the default role;

assign the pre-authentication role to the first user, the pre-authentication role enabling the first user to access common applications;

select from a plurality of rules, a first set of one or more rules associated with a first role corresponding to the first user;

apply, upon authentication, at least the first set of rules to the first packet to determine a first priority level in a forwarding queue for the first packet;

forward the first packet from the network device according to the first priority level to control the quality of service provided to the first user device inside the LAN.

13. The network device of claim 12, wherein to apply at least the first set of rules, the instructions are further to cause the hardware processor to:

allow forwarding of portions of data that are addressed to a set of ports allowed for the first user device and restrict forwarding of portions of data that are not addressed to the set of ports allowed for the first user device.

14. The network device of claim 12, wherein the instructions are further to cause the hardware processor to:

allow forwarding of portions of data that are associated with a set of protocols allowed for the first user device and restrict forwarding of portions of data that are not associated with the set of protocols allowed for the first user device.

15. The network device of claim 12, wherein the instructions are further to cause the processor to:

allow forwarding of portions of data that are associated with one of a set of source addresses allowed for the first user device and restrict forwarding of portions of the data that are not associated with any of the set of source addresses allowed for the first user device.

16. The network device of claim 12, wherein the network device is a switch.

17. The network device of claim 12, wherein the instructions are further to cause the hardware processor to apply the set of rules to further determine one or more of the following actions for at least a portion of the first packet: deny, permit, redirect, Network Address Translation (NAT), blacklist, log, mirror, queue, or select type of service.

18. The network device of claim 12, wherein the instructions that are to cause the hardware processor to forward the first packet comprises one or more of: (a) instructions to cause the hardware processor to redirect a first portion of the first packet, (b) instructions to cause the hardware processor to perform a Network Address Translation (NAT) action on the first portion of data first packet, or (c) instructions to cause the hardware processor to mirror the first portion of the first packet.

19. The network device of claim 12, wherein the instructions to apply at least the first set of rules are to cause the one or more hardware processors to apply at least the first set of rules to further detect a type of service for the first packet.

20. The network device of claim 12, wherein the instructions are further to cause the processor to:

receive, at the network device in a Local Area Network (LAN), a second packet from a third network device outside of the LAN;

determine a second user device, inside the LAN, associated with the second packet received at the first network device;

select a second set of one or more rules, from the plurality of rules, corresponding to the second user device associated with the second packet;

apply at least the second set of rules to the second packet to determine a second priority level in the forwarding queue for the second packet, wherein the second priority level is lower than the first priority level; and forward the second packet from the first network device to the second user device according to the second priority level such that the network provides a lower quality of service to the second user than the first user.

21. A method comprising:

receiving, at a network switch in a network in a Local Area Network (LAN), a first packet associated with a first user device of a first user;

determining the first user device, inside the LAN, associated with the first packet received at the first network device;

assigning a default role to the first user upon receiving the first packet, the default role providing services enabling the first user for a pre-authentication role with greater access to network services than the default role;

assigning the pre-authentication role to the first user, the pre-authentication role enabling the first user to access common applications;

selecting, by the processor, from a plurality of rules, a first set of one or more rules associated with a first role corresponding to the first user;

applying, by the processor, upon authentication, at least the first set of rules to the first packet to determine a first priority level for the first packet in a forwarding queue;

forwarding, by the processor, the first packet from the network switch according to the first priority level to control the quality of service provided to the first user inside the LAN.

* * * * *